United States Patent
Karthaeuser

Patent Number: 6,142,183
Date of Patent: Nov. 7, 2000

[54] ELECTROMAGNETIC PROPORTIONAL VALVE

[75] Inventor: Klaus Karthaeuser, Grossbottwar, Germany

[73] Assignee: Robert Bosch GmbH, Stuttgart, Germany

[21] Appl. No.: 09/502,495

[22] Filed: Feb. 11, 2000

[30] Foreign Application Priority Data

Feb. 11, 1999 [DE] Germany ............ 199 05 605

[51] Int. Cl.[7] .................................... F15B 13/043
[52] U.S. Cl. ........................ 137/627.5; 137/596.16; 303/119.1
[58] Field of Search .............. 137/627.5, 596.16; 251/30.01, 129.02, 129.2; 303/119.1, 115.2, 116.1

[56] References Cited

U.S. PATENT DOCUMENTS

| | | | |
|---|---|---|---|
| 3,989,063 | 11/1976 | Brouwers et al. | 137/627.5 |
| 4,077,674 | 3/1978 | Doto | 137/627.5 |
| 4,452,267 | 6/1984 | Ott et al. | 137/627.5 |
| 4,565,209 | 1/1986 | Ruchser et al. | 137/627.5 |
| 4,840,193 | 6/1989 | Schiel | 137/627.5 |
| 4,919,168 | 4/1990 | Wagner | 137/627.5 |
| 4,979,537 | 12/1990 | Offenwanger | 137/627.5 |
| 5,080,136 | 1/1992 | Schiel et al. | 137/627.5 |
| 5,205,324 | 4/1993 | Salemka | 137/627.5 |
| 5,401,085 | 3/1995 | Burgdorf et al. | 137/627.5 |
| 5,641,211 | 6/1997 | Feigel et al. | 137/627.5 |
| 5,725,289 | 3/1998 | Mueller | 137/627.5 |

Primary Examiner—Gregory L. Huson
Assistant Examiner—Joanne Y. Kim
Attorney, Agent, or Firm—Ronald E. Greigg; Edwin E. Greigg

[57] ABSTRACT

An electromagnetic proportional valve with an outlet chamber that communicates via a fixed valve with a first valve chamber and via a movable valve with a second valve chamber. A valve seat of the fixed valve is embodied on the valve body and the valve seat of the movable valve is embodied on the valve member of the fixed valve. A movable sealing element seals off the two valve chambers from one another. The sealing element, for the sake of achieving the least possible hysteresis, is embodied as a metal bellows that extends through the first valve chamber and on each end is fixed in sealed fashion, on the valve member of the fixed valve and on the valve body.

15 Claims, 1 Drawing Sheet

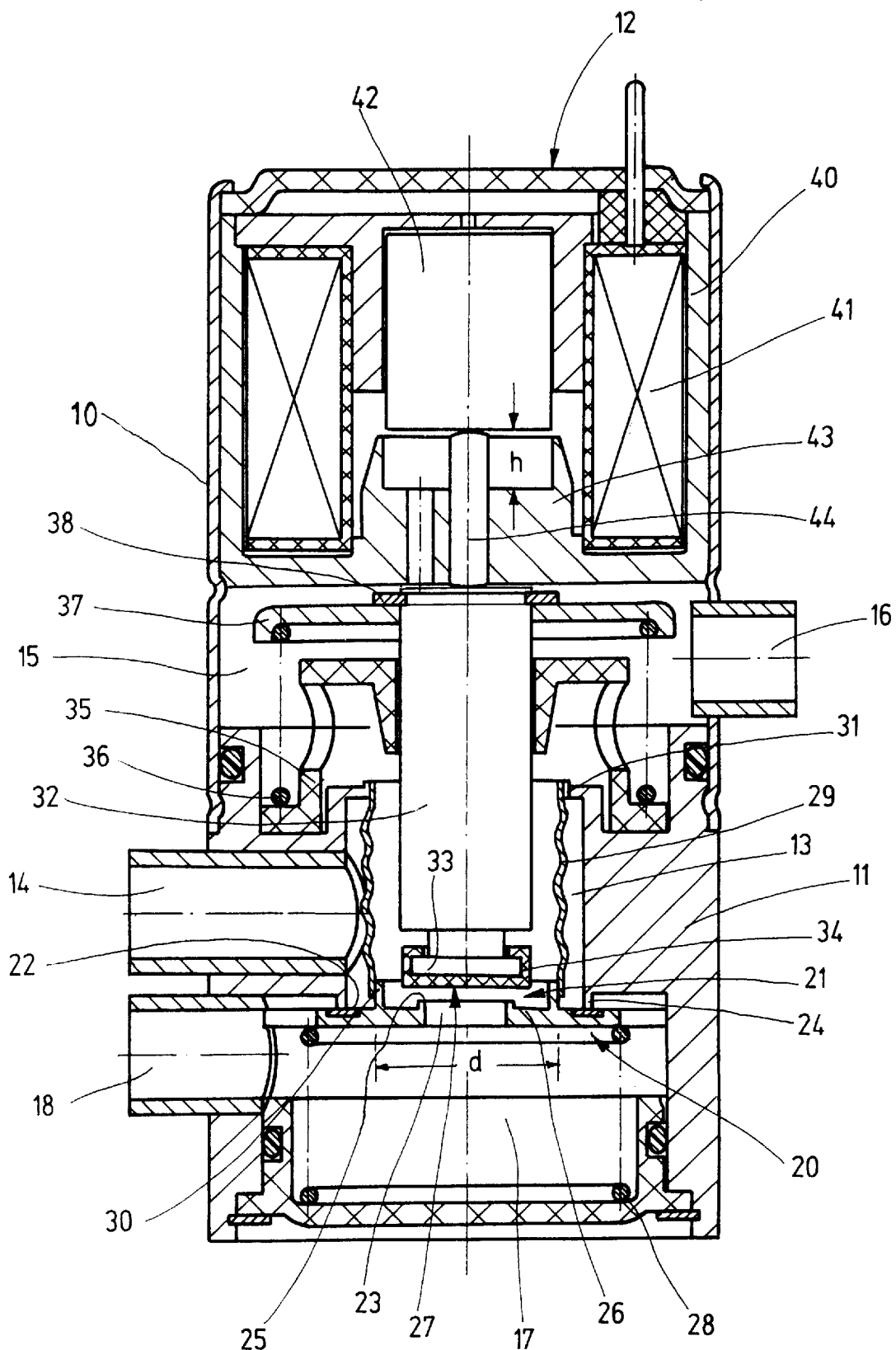

ELECTROMAGNETIC PROPORTIONAL VALVE

BACKGROUND OF THE INVENTION

Electromagnetic proportional valves for manifold applications are known. In such a proportional valve, to achieve a correlation and preferably a linear dependency between an input variable and an output variable, the output variable is fed back to the input variable, so that for each input variable a corresponding equilibrium is established, resulting in a precisely defined relationship between the input variable and the output variable.

In the case where the proportional valves are used for motor vehicle brake systems for the sake of controlling a brake booster for automatic intervention into the brake system, for instance in the case of an electronic stability program or automatic adaptive cruise control, the input variable of the proportional valve is adjusted to the current supplied to the proportional magnet; the current is set by a control unit, for instance by voltage tracking or by pulse width modulation of a voltage. The output variable is the pressure level controlled in the brake booster. Since the maximum available potential for the negative-pressure brake boosters generally used is the difference between the ambient pressure and the pressure in the intake system of the engine, the maximum usable working pressure in Otto engines is only 0.8 bar (with the throttle valve closed). For the required high-precision metering of the braking action, a very precisely operating proportional valve is therefore necessary that adjusts the brake pressure with the least possible hysteresis.

In a known electromagnetic proportional valve of this generic type (European Patent Disclosure (EP 0 682 615 B1), the movable valve member and the sealing element are embodied integrally as a resilient rubber tube, which is reinforced on the inside with a metal ring in the region of the valve member. The free end of the tube, remote from the ring, is secured to the valve body in an airtight fashion. Such so-called rubber collars exhibit a temperature-dependent deviation in terms of their hysteresis, which has an adverse effect on the aforementioned purpose of high-precision metering of the braking action.

Proportional valves are also known in which the sealing element is embodied as a sliding seal, which seals off the valve member of the fixed valve from a chamber wall disposed between the two valve chambers. O-rings or lip seals are used as these sliding seals. Sliding seals of this kind have what is known as a stick-slip effect; that is, on running up against the valve member they have very strong adhesion, which decreases markedly when they slide. Once again, this makes fine metering of the pressure controlled in the brake booster impossible.

OBJECT AND SUMMARY OF THE INVENTION

The proportional valve of the invention has an advantage over the prior art that because the sealing element is embodied as a metal bellows, it has extremely low hysteresis, since neither temperature-dictated deviations nor stick-slip effects occur. Unlike a sliding seal, the metal bellows is simultaneously used to generate the reaction force that feeds the output variable back to the input variable. The construction of the proportional valve is simple and the number of parts involved is low, and the tolerances to be adhered to for these parts are suitable for production. The proportional valve is distinguished by an extremely low vulnerability to malfunction.

By means of the provisions recited herein, advantageous refinements of and improvements to the proportional valve are possible.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE shows an exemplary embodiment of the invention in the form of a longitudinal section through a proportional valve.

DESCRIPTION OF THE PREFERRED EMBODIMENT

The electromagnetic proportional valve, sketched in longitudinal section in the drawing, preferably serves in motor vehicle brake systems for controlling a brake pressure in a negative-pressure brake booster. The valve has a valve body 11, which is received in a sheath 10 together with an electric proportional magnet 12, resting with an end face thereon. By crimping over the sheath 10 in the region of the proportional magnet 12 and the valve body 11, the valve body 11 and the proportional valve 12 are solidly joined to one another. A first valve chamber 13 communicates with a first valve inlet 14, a second valve chamber 15 communicates with a second valve inlet 16, and an outlet chamber 17 communicates with a valve outlet 18 each of which are embodied in the valve body 11. In use, for the intended use in brake systems, the valve outlet 18 communicates with a negative-pressure brake booster; the second valve inlet 16 is connected to the intake tube of the engine; and the first valve inlet 14 communicates with the atmosphere.

A fixed valve 20 is disposed between the outlet chamber 17 and the first valve chamber 13, and a movable valve 21 is disposed between the outlet chamber 17 and the second valve chamber 15. Each valve 20, 21 has a valve opening 22 and 23, disposed between the outlet chamber 17 and the respective associated valve chamber 13 and 15, with a valve seat 24 and 25 surrounding the valve opening and with a valve member 26 and 27 cooperating with the associated valve seat 24 and 25, respectively. The valve member 26 of the fixed valve 20 is pressed onto the valve seat 24 by a valve closing spring 28, which to that end is braced in the outlet chamber 17, on one end on the valve body 11 and on the other on the valve member 26. The valve member 27 of the movable valve 21 is actuated by the proportional magnet 12. The two valve chambers 13, 15 are sealed off from one another by a movable sealing element, which in a special feature of the novel proportional valve described here is a metal bellows 29, which extends coaxially through the first valve chamber 13 and is fixed at one end to the valve member 26 of the fixed valve 20 and on the other end to the valve body 11. To that end, an axially extending annular collar 30, which surrounds the valve opening 23 and valve seat 25 of the movable valve 21 with radial clearance, is formed integrally onto the valve member 26 of the fixed valve 20, and an annular flange 31 protruding into the first valve chamber 13 is embodied integrally with the valve body 11. The metal bellows 29 is thrust with one end over the annular collar 30; with its other end it is inserted into the annular flange 31 and secured tightly in each case.

The valve member 27 of the movable valve 21 is disposed fixedly on the face end of a displacement piston 32 and comprises a head 33 that is integral with the displacement piston 32 and is T-shaped in longitudinal section and a cap 34 of elastic material fitted over onto the head 33, with which cap the head 33 presses onto the valve seat 25 of the movable valve 21 and closes the valve opening 23. The displacement piston 32 is guided axially displaceably in the valve body 11 and to that end is received in a plastic guide member 35 that is inserted into the second valve chamber 15 and is firmly braced against the valve body 11 by a valve opening spring 36. The valve opening spring 36, which as a helical compression spring surrounds the displacement piston 32 with radial clearance. The valve opening spring 36 is braced via the guide member 35 on the valve body 11 and on a spring plate 37, which is seated on the displacement piston 32 and under the influence of the valve opening spring 36 presses against an axial stop, formed by a securing ring 38, on the displacement piston 32.

The proportional magnet 12 has a magnet cup 40, a magnet coil 41 located in the cup, and an armature 42 coaxially disposed in the magnet cup 40. The armature 42 is axially displaceably guided in the magnet cup 40 and, given maximum current supply to the magnet coil 41, can be displaced axially by a stroke h; the stroke h is defined by a coaxial peg 43, axially facing the armature 42 that is embodied integrally with the magnet cup 40. A tappet 44 is axially displaceably guided in the peg 43; with one of its ends, the tappet rests on the face end of the armature 42, and with its other end it rests on the face end of the displacement piston 32 and transmits the reciprocating motion of the armature 42 to the displacement piston 32. If there is no current supplied to the proportional magnet, or in other words the magnet coil 41 is currentless, the displacement piston 32 rests with its face end on the magnet cup 40 under the influence of the valve opening spring 36, and the tappet 44 is located without play between the armature 42 and the displacement piston 32.

The mode of operation of the proportional valve described is as follows:

In the state shown in the drawing, with the proportional magnet 12 currentless, the effective area of the negative-pressure brake booster connected to the valve outlet 18 communicates, via the opened movable valve 21, with the negative pressure of the intake tube applied to the second valve inlet 16, and as a result the brake booster remains in the deactivated position.

When current is supplied to the magnet coil 41 of the proportional magnet 12, its armature 42 moves outward and, via the tappet 44, displaces the displacement piston 32 counter to the force of the valve opening spring. As soon as the valve member 27 becomes seated on the valve seat 25, the valve opening 23 is closed and the communication of the negative-pressure brake booster with the negative pressure of the intake tube is disrupted. In the further course of the reciprocating motion of the armature 42, the valve member 26 of the fixed valve 20 is now lifted from its valve seat 24, thus creating a communication of the outlet chamber 17 with the first valve chamber 13 and connecting the effective area of the negative-pressure brake booster with the first valve chamber 13 that is subject to ambient pressure. Once the valve member 26 has lifted from the valve seat 24, the pressure rising in the outlet chamber 17, by way of the area d of the valve member 26 in communication with the metal bellows 29, generates a reaction force that counteracts the force of the proportional magnet 12. When a certain pressure value is reached, this reaction or restoring force causes the valve member 26 to be re-seated on the valve seat 24, thus preventing any further pressure rise in the outlet chamber 17. If the electric current delivered to the magnet coil 41 is now kept constant, then this pressure value remains constant as well, since the movable valve 21 is still closed. If the pressure in the negative-pressure brake booster is to be reduced further, this can be done only by partly or completely venting the outlet chamber 17 to the intake tube pressure, after which the pressure is reset to the lower level in the manner described above.

The foregoing relates to a preferred exemplary embodiment of the invention, it being understood that other variants and embodiments thereof are possible within the spirit and scope of the invention, the latter being defined by the appended claims.

I claim:

1. An electromagnetic proportional valve having first and second valve chambers (13, 15) embodied in a valve body (11), the first valve chamber (13) communicates with a first valve inlet (14) for connecting the first valve chamber of a first pressure source and the second valve chamber (15) communicates with a second valve inlet (16) for connection to said second valve chamber of a second pressure source, an outlet chamber (17) that communicates with a valve outlet (18) and embodied in the valve body (11) for controlling an outlet pressure, a fixed valve (20) is disposed between the outlet chamber (17) and the first valve chamber (13) and a movable valve (21) is disposed between the outlet chamber (17) and the second valve chamber (15), the valves each have a respective valve seat (24, 25) that surrounds a valve opening (22, 23), and a valve member (26, 27) that cooperates with the respective valve seat, and the valve seat (24) of the fixed valve (20) is embodied on the valve body (11) and the valve seat (25) of the movable valve (21) is embodied on the valve member (26) of the fixed valve (20), and a valve closing spring (28) acts on the valve member (26) of the fixed valve (20) and an electrically triggered proportional magnet (12) acts on the valve member (27) of the movable valve (21), and a movable sealing element that seals off the two valve chambers (13, 15) from each other and is fixed on the one hand to the valve member (26) of the fixed valve (20) and on the other to the valve body (11), the sealing element is embodied as a metal bellows (29), which extends all the way through the first valve chamber (13).

2. The proportional valve according to claim 1, in which an annular collar (30) surrounds the valve seat (25) of the movable valve (21) with radial clearance and protrudes axially from the valve member (26) of the fixed valve (20), and an annular flange (31) that protrudes into the first valve chamber (13) is embodied, integrally, on the valve body (11), and that the metal bellows (29) is thrust with one end over an annular collar (30) and another end is inserted into an annular flange (31), and is secured in each location in a sealing fashion.

3. The proportional valve according to claim 1, in which the valve member (27) of the movable valve (21) is fixedly disposed on the face end of a displacement piston (32) that is guided axially displaceably in the valve body (11), and that a valve opening spring (36) is braced between the displacement piston (32) and the valve body (11).

4. The proportional valve according to claim 2, in which the valve member (27) of the movable valve (21) is fixedly disposed on the face end of a displacement piston (32) that is guided axially displaceably in the valve body (11), and that a valve opening spring (36) is braced between the displacement piston (32) and the valve body (11).

5. The proportional valve according to claim 4, in which the valve opening spring (36) is embodied as a helical compression spring which coaxially surrounds the displacement piston (32) and is braced on one end on the valve body (11) and another end on a spring plate (37) seated axially non-displaceably on the displacement piston (32).

6. The proportional valve according to claim 5, in which the proportional magnet (12) has a magnet cup (40), a magnet coil (41) located inside the cup, and a coaxial armature (42) guided axially displaceably in the magnet cup (40), and that between the armature (42) and the displacement piston (32) a motion transmitting tappet (44) is disposed and guided displaceably, said tappet on a face end rests without play respectively on face ends, facing toward one another, of the armature (42) and the displacement piston (32).

7. The proportional valve according to claim 6, in which the proportional magnet (12) is received in a sheath (10) and is fixed on the valve body (11) by crimping over of the sheath (10) on the valve body.

8. The proportional valve according to claim 4, in which the proportional magnet (12) has a magnet cup (40), a magnet coil (41) located inside the cup, and a coaxial armature (42) guided axially displaceably in the magnet cup (40), and that between the armature (42) and the displacement piston (32) a motion transmitting tappet (44) is disposed and guided displaceably, said tappet on a face end rests without play respectively on face ends, facing toward one another, of the armature (42) and the displacement piston (32).

9. The proportional valve according to claim 8, in which the proportional magnet (12) is received in a sheath (10) and is fixed on the valve body (11) by crimping over of the sheath (10) on the valve body.

10. The proportional valve according to claim 3, in which the valve opening spring (36) is embodied as a helical compression spring which coaxially surrounds the displacement piston (32) and is braced on one end on the valve body (11) and another end on a spring plate (37) seated axially non-displaceably on the displacement piston (32).

11. The proportional valve according to claim 10, in which the proportional magnet (12) has a magnet cup (40), a magnet coil (41) located inside the cup, and a coaxial armature (42) guided axially displaceably in the magnet cup (40), and that between the armature (42) and the displacement piston (32) a motion transmitting tappet (44) is disposed and guided displaceably, said tappet on a face end rests without play respectively on face ends, facing toward one another, of the armature (42) and the displacement piston (32).

12. The proportional valve according to claim 11, in which the proportional magnet (12) is received in a sheath (10) and is fixed on the valve body (11) by crimping over of the sheath (10) on the valve body.

13. The proportional valve according to claim 3, in which the proportional magnet (12) has a magnet cup (40), a magnet coil (41) located inside the cup, and a coaxial armature (42) guided axially displaceably in the magnet cup (40), and that between the armature (42) and the displacement piston (32) a motion transmitting tappet (44) is disposed and guided displaceably, said tappet on a face end rests without play respectively on face ends, facing toward one another, of the armature (42) and the displacement piston (32).

14. The proportional valve according to claim 13, in which the proportional magnet (12) is received in a sheath (10) and is fixed on the valve body (11) by crimping over of the sheath (10) on the valve body.

15. The proportional valve according to claim 1, in which the valve outlet (18) communicates with a negative-pressure brake booster of a motor vehicle, and that the first pressure source is ambient pressure and the second pressure source is a negative pressure of the intake tube of the motor vehicle.

* * * * *